Sept. 11, 1962     A. S. BAHRANI     3,053,277
ROTARY MIXING VALVE
Filed April 14, 1958                            2 Sheets-Sheet 2
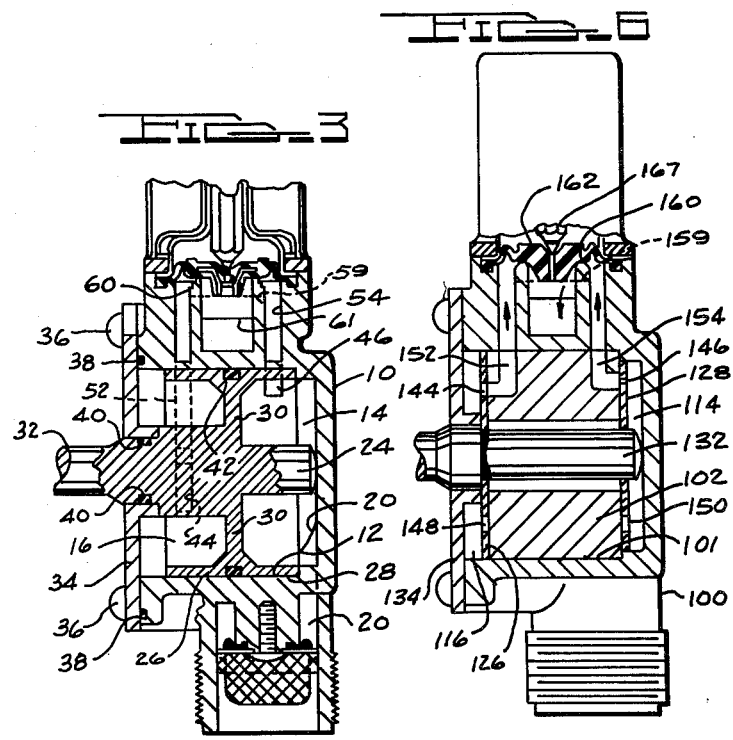
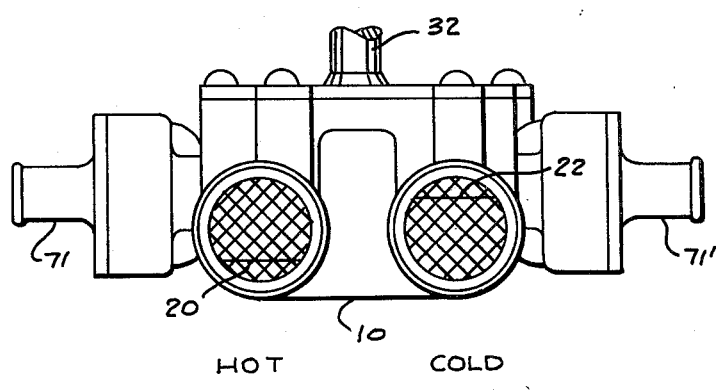
INVENTOR.
ABDUL SATTAR BAHRANI
BY
SMITH, WILSON, LEWIS & McRAE

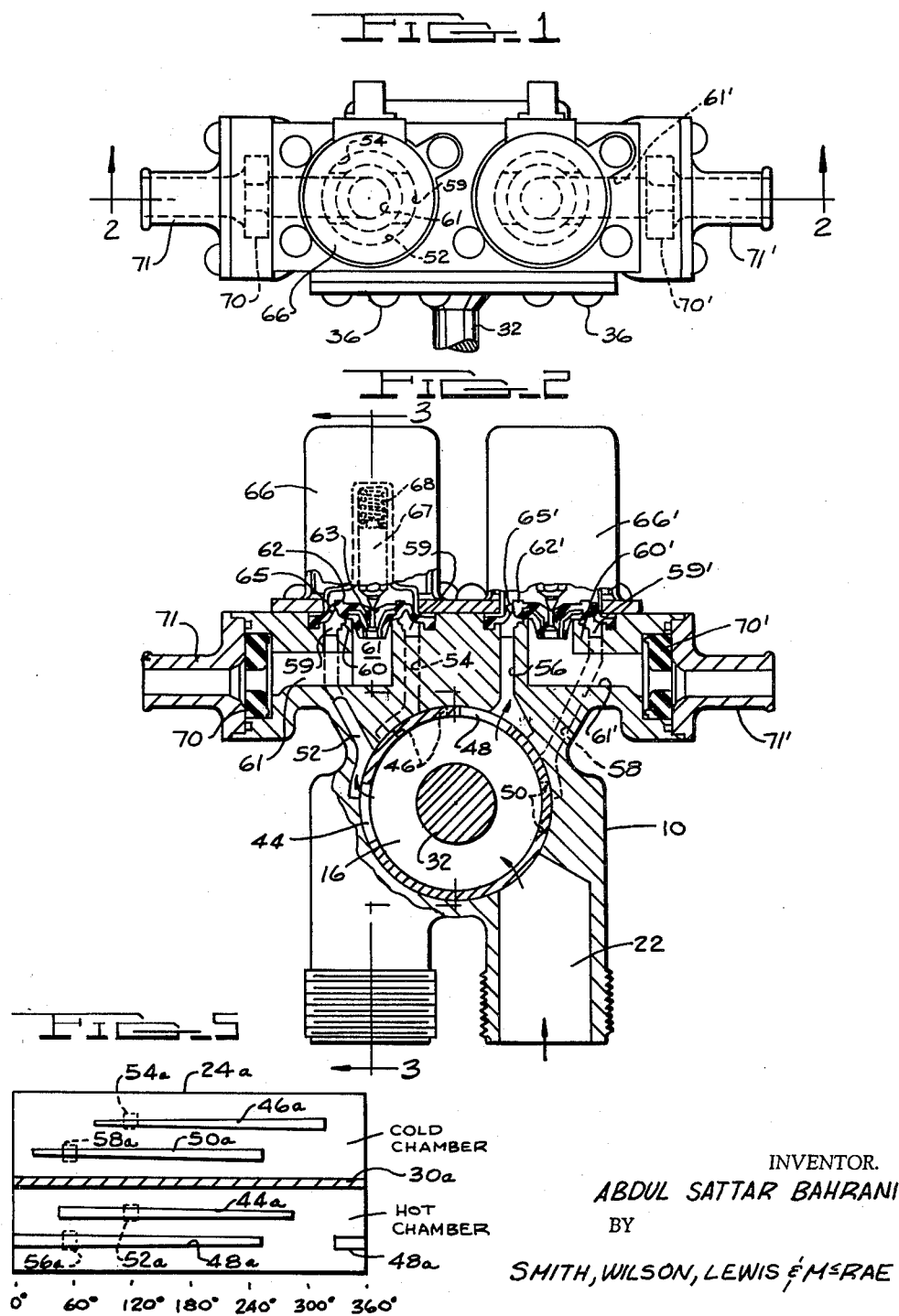

United States Patent Office

3,053,277
Patented Sept. 11, 1962

3,053,277
ROTARY MIXING VALVE
Abdul Sattar Bahrani, Drayton Plains, Mich., assignor to American Radiator & Standard Sanitary Corporation, New York, N.Y., a corporation of Delaware
Filed Apr. 14, 1958, Ser. No. 728,170
9 Claims. (Cl. 137—597)

This invention relates to a valve device having a rotatably adjustable flow control element for proportioning relative flows from separate hot and cold fluid chambers. The valve device has application as a mixing valve for supplying water of different temperatures to the tub of an automatic clothes washing machine or dishwashing machine.

Objects of the invention are to provide a valve device of the above mentioned character wherein:

(1) For any given inlet pressure condition substantially the same volumetric flow is produced irrespective of the temperature setting of the device, (2) Considerable inlet and outlet pressure variations can be tolerated without loss of temperature control, (3) The valve device utilizes two (or more) separate solenoids for supplying a washing machine with differently tempered wash water and rinse water, as well as wash and rinse additives, the arrangement being such as to eliminate the need for additional solenoids or power devices normally employed to dispense the wash-rinse additives, (4) The valve device includes a hollow cylindrical flow control element rotatably mounted about its central axis so as to cut across the flow streams with minimum interference from the fluids, thereby permitting quick and easy manual movement of the element, (5) The valve device includes simplified mechanism for adjusting its temperature setting, (6) The valve device is of comparatively low cost construction, considering the functions which it is designed to perform, and (7) The valve device is of such design that the pressure inside the mixing chambers is the same prior to operation of any solenoid, and the flow control element walls expand when a solenoid is energized, thus sealing against cross over leakage from one port to another.

Other objects of this invention will appear in the following description and appended claims, reference being had to the accompanying drawings forming a part of this specification wherein like reference characters designate corresponding parts in the several views.

In the drawings:

FIG. 1 is a top plan view of one embodiment of the invention.

FIG. 2 is a sectional view taken on line 2—2 in FIG. 1.

FIG. 3 is a sectional view taken on line 3—3 in FIG. 2.

FIG. 4 is a bottom plan view of the FIG. 1 embodiment.

FIG. 5 is a developed view of the cylindrical valve element constructed according to the invention.

FIG. 6 is a view taken in substantially as FIG. 3 but through another embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a plastic valve body 10 formed with a generally cylindrical cavity 12. Portion 14 of the cavity forms a hot fluid chamber, and portion 16 forms a cold fluid chamber. Hot and cold fluids are supplied to the respective chambers through inlet passages 20 and 22. Passage 22 is not completely visible in the drawings, but it connects with chamber 16 at a point closely adjacent closure plate 34.

Rotatably fitting within cavity 12 is a hollow valve element 24 defining two connected cylindrical sections 26 and 28. A diametrically extending partition 30 connects element 24 with an actuator shaft 32. This shaft extends through a plate 34 which is removably secured on one face of body 10 by means of screws 36. O-ring seals are provided at 38, 40 and 42 to prevent fluid leakage.

Valve element 24 is provided with ports 44, 46, 48 and 50 which individually register with passages 52, 54, 56 and 58. The ports are shown in FIG. 2 as circumferentially elongated slots but they could each be formed as a line of separate circumferentially spaced holes for step temperature control. Passages 52 and 54 extend from ports 44 and 46 into communication with an annular chamber 59 surrounding an annular valve seat wall 60. The central space encompassed by wall 60 forms a discharge passage 61 for receiving the fluid passing over the valve seat 60.

To control the flow of fluid past seat 60 there is provided a rubber diaphragm 62 having a central opening 63 and a smaller bleed opening 65. A solenoid 66 is positioned above the diaphragm to have its armature 67 in registry with opening 63. Compression spring 68 urges armature 67 to a position closing the central opening when the solenoid is de-energized.

In operation of the diaphragm, when solenoid 66 is energized armature 67 is retracted upwardly to open the central opening. The pressure of fluid in chamber 59 is thereby effective to force diaphragm 62 upwardly away from seat 60 so as to allow the chamber 59 fluid to flow into discharge passage 61 and thence through resilient annular flow control element 70 into the outlet spigot 71. When solenoid 66 is de-energized spring 68 causes armature 67 to close central opening 63. Chamber 59 fluid thereby bleeds through opening 65 so as to develop a downward force on the upper face of the diaphragm. This force closes the diaphragm against seat 60 and prevents flow into passage 61.

It will be noted from FIG. 2 that the fractional area of port 44 in registry with passage 52 is less than the fractional area of port 46 in registry with passage 54; consequently the volumetric flow of hot water through passage 54 will be greater than the volumetric flow of cold water through passage 52. As a result the mixed fluid in discharge passage 61 will be relatively hot. The discharged fluid can be made hotter by turning shaft 32 counterclockwise and colder by turning shaft 32 clockwise. However when holes are used instead of slots it is possible to have hot, cold, warm and hot again by turning in one direction only.

Due to the fact that element 24 cuts through the fluid (in ports 44 and 46) at right angles to the direction of fluid flow the fluid resistance to turning of shaft 32 is comparatively small; as a result the shaft can be easily manipulated.

However, there is little tendency for element 24 to be inadvertently rotated from a desired position by the fluid once it has been set in an adjusted position. Thus, when solenoid 66 is energized to open diaphragm 62 the fluid pressure in chamber 16 acts radially outward in all directions on annular vane element 24 so as to expand thin wall 26 tightly against cavity surface 12. The valve element is thereby tightly seated in its adjusted position. The tight seating not only prevents inadvertent valve element rotation but also prevents fluid leakage along the portion of cavity surface 12 located between ports 44 and 46.

Passages 56 and 58 lead from ports 48 and 50 to an annular chamber 59' defined by an annular valve seat wall 60'. The central space within wall 60' defines a discharge passage 61' for conducting fluid through flow washer 70' located at the mouth of outlet spigot 71'. Fluid flow from chamber 59' into passage 61' is controlled by a diaphragm 62' and solenoid 66' operating in the same manner as the previously described diaphragm and solenoid.

In use of the illustrated valve with a washing machine solenoid 66 controls the flow of wash water to the tub, and solenoid 66' controls the flow of rinse water to the tub. It will be noted from FIG. 2 that ports 48 and 50 are offset from their adjacent passages by different circumferential distances than the offsetting of ports 44 and 46 from their respective passages. The arrangement is such that the fluid issuing from spigot 71' is cooler than the fluid issuing from spigot 71. As a result spigot 71' is conveniently suited to deliver warm water during the rinse cycle, while spigot 71 is suited to deliver hot water during the wash cycle. The exact temperatures of the wash and rinse fluids will of course depend on the setting of valve element 24 (by manual turning of shaft 32). It will be understood that preparatory to the wash-rinse cycle the housewife will set shaft 32 in an adjusted position such that its pointer (not shown) registers with indicia indicating the water temperatures. The indicia may be in temperatures such as "hot wash-medium rinse," "medium hot wash-cold rinse" or "medium warm wash-cold rinse." Alternately the indicia may be in terms of fabrics such as "wool," "cotton," etc.

The illustrated valve may be utilized with a washing machine in various different ways to aid in the dispensing of wash additives alone, wash additives and rinse additives, or rinse additives alone.

When the valve is utilized to dispense wash additives alone the additives are loaded in a reservoir located adjacent the tub in the path of the fluid issuing from rinse spigot 71'. The machine is loaded with wash water from spigot 71 by energizing solenoid 66. During the introduction of the wash water into the tub solenoid 66' is energized for a few seconds to wash the additives into the tub.

When the valve is utilized to dispense wash additives and rinse additives, the wash additives are loaded into a reservoir located in the path of recirculation water between the pump, filter and tub. The rinse additive is loaded into another reservoir located in the path of fluid issuing from spigot 71'. The rinse additive is washed into the tub by energization of solenoid 66' at beginning of the rinse cycle, and the wash additive is introduced into the tub by initial actuation of the pump.

When the valve is utilized to dispense rinse additives alone the additives are loaded into a reservoir in the path of fluid issuing from spigot 71'. Dispensing of the additives into the tub is accomplished by energization of solenoid 66' at the beginning of the rinse cycle.

It will be noted that with each of the three arrangements, solenoid 66' is utilized to flush additive into the washing machine tub while solenoid 66 is utilized to supply the tub with wash water; additionally solenoid 66' acts to economically deliver rinse water to the tub (irrespective of whether or not the valve is utilized to dispense additives). The utilization of the two solenoids on a single valve body makes for a compact, relatively low cost construction employing a minimum number of solenoids and flow control mechanisms. In the event that solenoid 66' is not used to dispense additives its discharge passage 61' may be connected with passage 61 instead of flow control 70'. With such an arrangement both the wash and rinse waters will issue from the valve through spigot 71.

FIG. 5 shows a developed view of a cylindrical valve element 24a having a different port-passage arrangement than that of the FIG. 2 element. In the FIG. 5 construction valve element 24a is provided with elongated slots 44a, 46a, 48a and 50A which register with fixed passages 53A, 54a, 56a, and 58a formed in the valve body. It will be noted that passages 52a and 56a are offset axially from one another (i.e. at right angles to partition 30a). In like manner passages 54a and 58a are offset axially from one another. With this arrangement the valve element can be rotated a complete revolution without danger of the passages registering with undesired ones of the slots. It will be noted that the slots are slightly tapered along their lengths so as to present different areas to their registering passages as the valve element is rotated. In practice the slots may be given any desired configurations in accordance with the desired fluid flow therethrough.

The FIG. 6 structure includes a valve body 100 having a cylindrical cavity 101 in which is fixedly positioned an insert 102 for defining a hot fluid chamber 114 and a cold fluid chamber 116. Hot and cold fluids are supplied to these chambers through inlets similar to inlets 20 and 22 of the FIG. 1 embodiment.

Extending centrally through insert 102 is a rotary shaft 132 which carries two parallel valve element disks 126 and 128 for rotation on the opposite faces of the insert. The disks are provided with four ports in the form of circumferential slots 144, 146, 148 and 150. The slots vary in width at different points along their lengths so as to provide adjustable sized fluid flow paths in accordance with the rotated positions of the disks.

Port 144 registers with passage 152 which extends through insert 102 and body 100 into communication with an annular chamber 159. Port 146 registers with passage 154 which extends into communication with chamber 159. Fluid from chamber 159 flows past annular seat 160 into discharge passage 161. On-off control of the fluid flow is provided by solenoid-operated diaphragm 162.

Ports 148 and 150 register with passages (not shown) which lead to a solenoid-operated diaphragm and annular valve seat arranged in the manner of diaphragm 159 and seat 160.

Ports 144 and 146 control the cold and hot wash water mixture. Ports 148 and 150 control the cold and hot rinse water mixture. The general mode of operation is similar to that of the FIG. 1 embodiment in that rotary movement of shaft 132 is utilized to vary the outgoing temperatures. If desired the FIG. 6 structure may be utilized to dispense additives in the same manner as the FIG. 1 structure.

I claim:

1. A mixing valve for use in dispensing wash water, rinse water, and additives into the tub of a washing machine comprising a hollow valve body defining two axially spaced internal end surfaces; cylindrical valve element means including two connected circular sections rotatably fitting within the valve body between the two spaced internal end surfaces; said circular sections being spaced from the internal end surfaces so as to cooperate therewith in defining two separate axially aligned chambers for receiving hot and cold fluids; first and second ports formed through the walls of said valve element sections in registry with respective ones of the hot and cold fluid chambers; a first annular valve seat formed in the valve body; first and second passages extending through the valve body from points upstream of the valve seat into registry with respective ones of the first and second ports; a discharge passage extending out of the valve body from a point immediately downstream from the valve seat; a second annular valve seat formed in the valve body; fourth and fifth passages extending through the valve body from the second valve seat into communication with individual ones of the circular chambers; a second discharge passage extending out of the valve body from a point immediately downstream from the second valve seat; first and second reciprocable valve members cooperating with respective ones of the valve seats to control fluid flow into respective ones of the discharge passages; and a separate electrically-controlled mechanism for operating each valve member; said first and second ports being arranged in different circumferential dispositions with respect to their adjacent passages to present inversely variable fractional areas thereto, whereby to inversely vary the relative fluid flows into the first and second passages in response to rotary movement of the cylindrical valve element; the first valve member being designed to control the flow of wash water into the tub of a washing machine, and the second valve member being designed to control the flow of rinse water and flushing water for dispensing additives into the washing machine tub.

2. A mixing valve comprising a valve body having hot and cold inlets; two hot passages within said body; two cold passages within said body; first electrical means controlling flow through one of the hot passages and one of the cold passages; second electrical means controlling flow through the other hot passage and other cold passage; means within the valve body defining a first port controlling flow to said one hot passage, a second port controlling flow to said one cold passage, a third port controlling flow to other hot passage, and a fourth port controlling flow to said other cold passage; and a rotatably adjustable valve element mounted within the valve body to traverse said ports for varying the relative flow sizes of the first and second ports, and for varying the relative flow sizes of the third and fourth ports.

3. A mixing valve for use in dispensing wash water, rinse water, and additives into the tub of a washing machine comprising a hollow valve body defining two axially spaced internal end surfaces; valve element means including two connected circular sections rotatably fitting within the valve body between the two spaced internal end surfaces; said circular sections being spaced from the internal end surfaces so as to cooperate therewith in defining two separate axially aligned chambers for receiving hot and cold fluids; first and second ports formed through the walls of said valve element means in registry with respective ones of the hot and cold fluid chambers; a first annular valve seat formed in the valve body; first and second passages extending through the valve body from points upstream of the valve seat into registry with respective ones of the first and second ports; a discharge passage extending out of the valve body from a point immediately downstream from the valve seat; a second annular valve seat formed in the valve body; fourth and fifth passages extending through the valve body from the second valve seat into communication with individual ones of the separate chambers; a second discharge passage extending out of the valve body from a point immediately downstream from the second valve seat; first and second reciprocable valve members cooperating with respective ones of the valve seats to control fluid flow into respective ones of the discharge passages; and a separate electrically-controlled mechanism for operating each valve member; said first and second ports being arranged in different circumferential dispositions with respect to their adjacent passages to present inversely variable fractional areas thereto, whereby to inversely vary the relative fluid flows into the first and second passages in response to rotary movement of the valve element means; the first valve member being designed to control the flow of wash water into the tub of a washing machine, and the second valve member being designed to control the flow of rinse water and flushing water for dispensing additives into the washing machine tub.

4. The combination of claim 3 wherein the valve element means comprises two parallel disks.

5. The combination of claim 3 wherein the valve element means takes the form of a hollow cylindrical valve element.

6. A mixing valve comprising a valve body having a hot water inlet and a cold water inlet; a first discharge passage for delivering water from the valve body; first electrically-operated shut-off means controlling flow through the first discharge passage; a second discharge passage for delivering water from the valve body; second electrically-operated shut-off means controlling flow through the second discharge passage; first valve element means within the valve body operative to supply the first and second discharge passages with hot water in predetermined amounts; second valve element means within the valve body operative to supply the first and second discharge passage with cold water in predetermined amounts; said first and second valve element means being connected for simultaneous movement, and manually-actuable means for simultaneously adjusting said first and second valve element means to vary the aforementioned predetermined amounts so as to change the temperature of each discharge stream.

7. A mixing valve comprising a valve housing having a hot fluid inlet, cold fluid inlet and first and second mixed fluid outlet means; a first passage system between the two inlets and the first outlet means; an electrically-controlled valve in said passage system; a second passage system between the two inlets and the second outlet means; an electrically-controlled valve in said second passage system; first adjustable metering means interposed between the two inlets and first passage system for selecting the relative quantities of hot and cold fluids flowing therethrough; second adjustable metering means interposed between the two inlets and second passage means for selecting the relative quantities of hot and cold fluids flowing therethrough; said first and second adjustable metering means being connected for simultaneous movement, and operator means for simultaneously setting the two metering means in a plurality of fixed but adjusted positions, whereby to permit variation in the temperature of fluid in each passage system.

8. A mixing valve comprising a valve body forming a cylindrical cavity; a hollow tubular valve element rotatably fitting said cavity; a partition extending diametrically across an intermediate portion of said valve element to subdivide the cavity into axially spaced hot and cold fluid chambers; first and second ports formed through the tubular wall of the valve element in registry with the hot and cold fluid chambers, respectively; a discharge passageway formed in the valve body to receive fluid from the first and second ports; connector passages extending through the valve body from registry with respective ones of the first and second ports into communication with the discharge passageway; said first and second ports being arranged in different circumferential dispositions with respect to their registering passages whereby to inversely vary the relative fluid flows into the discharge passageway in response to rotary movement of the tubular valve element.

9. A mixing valve comprising a hollow valve body having a partition therein forming a pair of axially aligned cavities for hot and cold fluids, respectively; a valve element disk rotatably adjustably fitting in each cavity; each of said disks having port means therethrough in registry with the respective cavity; a discharge passage; and first and second passages extending through the valve body partition from registry with respective ones of the port means into communication with said discharge passage; said port means being arranged in different circumferential dispositions with respect to their adjacent passages whereby to inversely vary the relative flows therein in response to rotary adjustments of the valve element disks.

(References on following page)

References Cited in the file of this patent

UNITED STATES PATENTS

| | | | |
|---|---|---|---|
| 1,571,810 | Shimp | Feb. 2, | 1926 |
| 1,896,092 | Mangiameli | Feb. 7, | 1933 |
| 2,523,801 | Woodson | Sept. 26, | 1950 |
| 2,562,875 | Ashton | Aug. 7, | 1951 |
| 2,571,047 | McWilliams | Oct. 9, | 1951 |
| 2,620,134 | Obermaier | Dec. 2, | 1952 |
| 2,643,537 | Woodson | June 30, | 1953 |
| 2,678,062 | MacNeil | May 11, | 1954 |

FOREIGN PATENTS

| | | | |
|---|---|---|---|
| 426,278 | Great Britain | Apr. 1, | 1935 |
| 476,386 | Italy | Dec. 9, | 1952 |